(12) United States Patent
North et al.

(10) Patent No.: US 12,199,701 B2
(45) Date of Patent: Jan. 14, 2025

(54) SYSTEM AND METHOD FOR A BATTERY INTEGRATED ANTENNA MODULE WITH THERMAL CROSS SPREADING

(71) Applicant: Dell Products, LP, Round Rock, TX (US)

(72) Inventors: Travis C. North, Cedar Park, TX (US); Qinghong He, Austin, TX (US)

(73) Assignee: DELL PRODUCTS LP, Round Rock, TX (US)

( * ) Notice: Subject to any disclaimer, the term of this patent is extended or adjusted under 35 U.S.C. 154(b) by 491 days.

(21) Appl. No.: 17/553,330

(22) Filed: Dec. 16, 2021

(65) Prior Publication Data

US 2023/0198576 A1 Jun. 22, 2023

(51) Int. Cl.
*H04B 7/00* (2006.01)
*H01M 10/42* (2006.01)
(Continued)

(52) U.S. Cl.
CPC .......... *H04B 7/005* (2013.01); *H01M 10/425* (2013.01); *H01M 10/443* (2013.01); *H01M 10/613* (2015.04); *H01M 10/653* (2015.04); *H01M 10/6556* (2015.04); *H01M 10/6561* (2015.04); *H01M 10/658* (2015.04); *H01Q 1/02* (2013.01); *H02J 7/0013* (2013.01); *H02J 7/0042* (2013.01); *H01M 2010/4271* (2013.01)

(58) Field of Classification Search
CPC .. H04B 7/005; H01M 10/613; H01M 10/653; H01M 10/6556; H01M 10/6561; H01M 10/658; H01M 10/425; H01M 10/443; H01M 2010/4271; H01Q 1/02; H02J 7/0013; H02J 7/0042
See application file for complete search history.

(56) References Cited

U.S. PATENT DOCUMENTS 10,069,191 B1 9/2018 Stieber
10,401,926 B1 * 9/2019 North ..................... G06F 1/1618
(Continued)

*Primary Examiner* — Junpeng Chen
(74) *Attorney, Agent, or Firm* — Prol Intellectual Property Law, PLLC; H. Kenneth Prol

(57) ABSTRACT

An information handling system may include a processor; a memory; a PMU; an antenna controller to receive data descriptive of the operating parameters of an antenna module housed within a battery housing of a battery operatively coupled to the PMU; a controller to receive power data descriptive of a charging and discharging of the battery; the battery housing including: the battery-integrated antenna module coupled to the housing of the battery and coupled to the antenna controller; one or more power cells; a thermal mitigation structure placed in the battery housing to sink heat generated by battery-integrated antenna module and the one or more power cells; and a cable array operatively coupling the antenna module to the controller; the controller executing code instructions of a battery-integrated antenna management system to receive temperature data of the battery and the antenna module and throttles the charge/discharge rate of the battery or throttles the transmission (TX)/reception (RX) at the antenna module based on the detected temperature data, operating parameters, and the power data.

20 Claims, 5 Drawing Sheets

(51) Int. Cl.
    *H01M 10/44*        (2006.01)
    *H01M 10/613*     (2014.01)
    *H01M 10/653*     (2014.01)
    *H01M 10/6556*   (2014.01)
    *H01M 10/6561*   (2014.01)
    *H01M 10/658*     (2014.01)
    *H01Q 1/02*        (2006.01)
    *H02J 7/00*         (2006.01)
    *H04B 7/005*      (2006.01)

(56) References Cited

U.S. PATENT DOCUMENTS

| | | |
|---|---|---|
| 10,729,036 B2 | 7/2020 | Jin |
| 10,816,607 B2 | 10/2020 | Karner |
| 11,122,710 B2 | 9/2021 | Jin |
| 2010/0328081 A1* | 12/2010 | Hu ............... H04B 1/3883 340/586 |
| 2010/0330950 A1* | 12/2010 | Wells ............. H04B 1/3883 340/584 |
| 2014/0091974 A1* | 4/2014 | Desclos ............. H01Q 1/243 29/601 |
| 2015/0000889 A1* | 1/2015 | Bellamkonda ........... G01K 7/42 165/287 |
| 2015/0077945 A1 | 3/2015 | Rhee |
| 2015/0148094 A1* | 5/2015 | Prociw ............. H04W 52/0251 455/574 |
| 2016/0154441 A1* | 6/2016 | Shen ............... G06F 1/163 361/679.03 |
| 2018/0262894 A1 | 9/2018 | Daoura |
| 2020/0058963 A1 | 2/2020 | Morris |
| 2020/0212510 A1 | 7/2020 | Holden |
| 2022/0239155 A1* | 7/2022 | Yang ............... H02J 7/007194 |
| 2022/0367938 A1* | 11/2022 | Ando ............... H01M 10/658 |

\* cited by examiner

SYSTEM AND METHOD FOR A BATTERY INTEGRATED ANTENNA MODULE WITH THERMAL CROSS SPREADING

FIELD OF THE DISCLOSURE

The present disclosure generally relates to a battery of an information handling system. The present disclosure more specifically relates to the co-location of an antenna at the housing of the battery of the information handling system.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. Further, the information handling system may include a battery used to power the information handling system and an antenna used to communicate with the information handling system.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
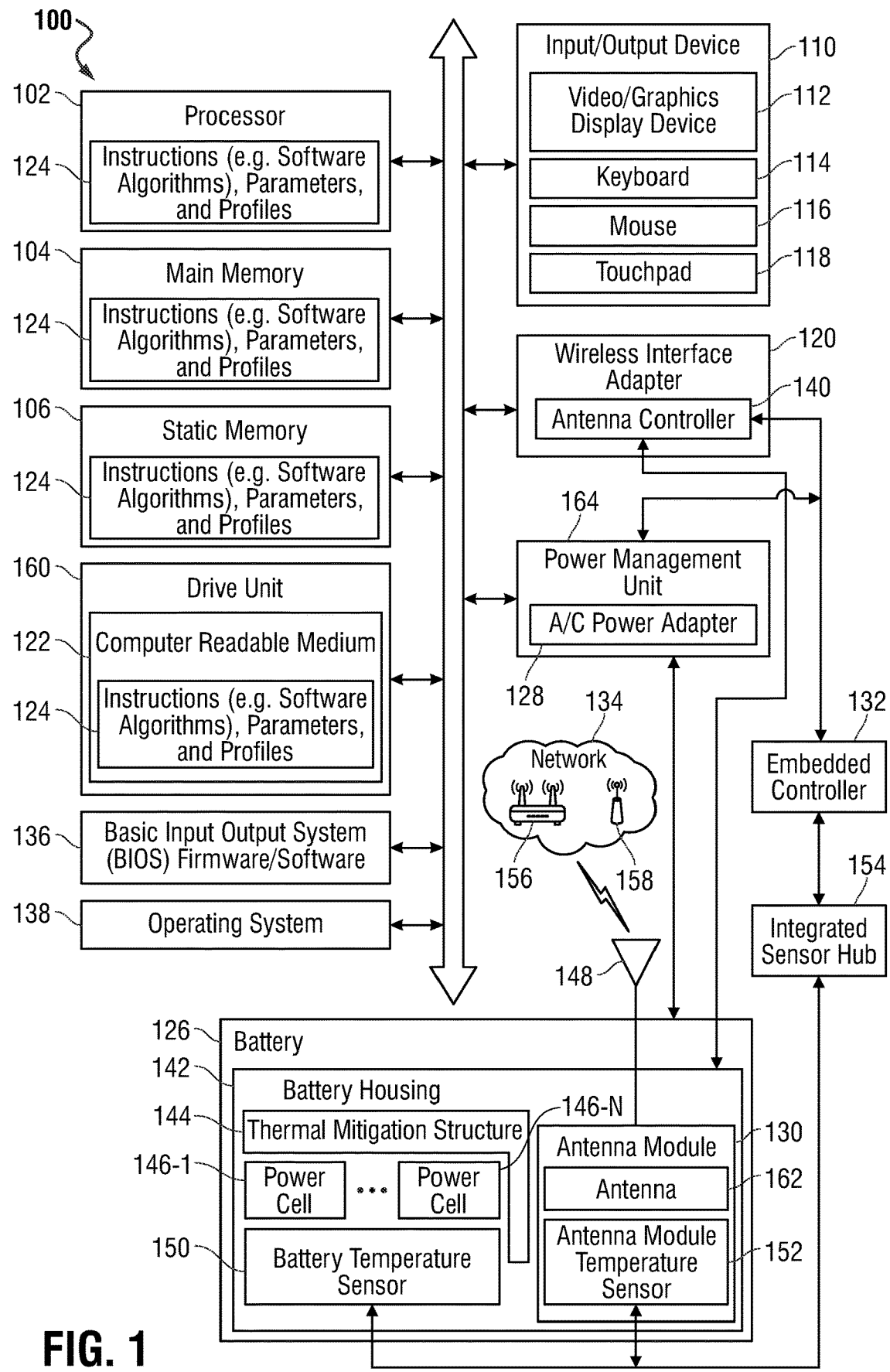
FIG. 1 is a block diagram illustrating an information handling system with a battery-integrated antenna module according to an embodiment of the present disclosure.

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Information handling systems may include one or more antennas used to operatively couple the information handling system to a wireless network. These information handling systems may be made mobile so that a user may travel with an information handling system from location to location and still access a wireless network. Still further, as more tasks associated with processing data are transitioned from the processor of the information handling system to an edge device or other networked device (e.g., cloud computing), 5G, sub-6 GHz, and mmWave communications are rendered relatively more important. This data transmission and reception (e.g., transception) of data may increase power consumption to peak levels especially where mmWave antennas are used to transceive this data. In some embodiments, this peak power consumption at the antenna may be as high as 1 W. With these levels of power consumption, the antennas may create higher temperatures second only to the central processing unit (CPU). The user may be especially susceptible to these higher temperatures as the housings at or near the antennas are heated via operation of these antennas. Thermal management of these antenna have become a focus in order to maintain wireless connectivity while protecting the user from injury or discomfort.

Embodiments of the present disclosure provide for an information handling system with a battery-integrated antenna module. The information handling system may include a processor, a memory, and a power management unit (PMU) with a battery used to power the information handling system. An antenna controller may be included and used to receive data descriptive of the operating parameters of an antenna module housed within a battery housing of a battery operatively coupled to the PMU. A controller (e.g., an embedded controller (EC), a processor, or the like) may be used to receive power data descriptive of a charging and discharging of the battery. The battery, in an embodiment, may include the antenna module operatively coupled to the housing of the battery and operatively coupled to the antenna controller, one or more power cells, and a thermal mitigation structure placed between the antenna module and the one or more power cells. A cable array within the battery may also be included to operatively couple the antenna module to the controller. In an embodiment, during operation, the controller may receive temperature data of the battery and the antenna module and throttle the charge/discharge rate of the battery or throttle the transmission (TX)/reception (RX) at the antenna module based on the detected temperature data, operating parameters, and the power data. This provides for dual use of heat dissipation by the controlling system for the battery or the antenna during operation.

With the integration of the antenna in the battery and its housing, heat generated by the operation of the antenna may be sunk into the mass of the battery thereby increasing run time capacity of the antenna system. This may further allow for minimizing the space used within the housing of the information handling system in those examples where the antenna and battery are placed, separately, within the information handling system. The execution of the systems and methods described herein also allow for further control of the information handling system and may be used to prioritize transception via the antenna over other operations such as charging or discharging the battery via execution of instructions of a battery-integrated antenna management system.

Turning now to the figures, FIG. 1 illustrates an information handling system 100 similar to information handling systems according to several aspects of the present disclosure. In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP), a base station transceiver, a wireless telephone, a control system, a camera, a scanner, a printer, a personal trusted device, a web appliance, or any other suitable machine capable of executing a set of instructions (sequential or otherwise) that specify actions to be taken by that machine, and may vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the information handling system 100 may be implemented using electronic devices that provide voice, video or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

The information handling system 100 may include memory (volatile (e.g., random-access memory, etc.), non-volatile (read-only memory, flash memory etc.) or any combination thereof), one or more processing resources, such as a central processing unit (CPU), a graphics processing unit (GPU), hardware or software control logic, or any combination thereof. Additional components of the information handling system 100 may include one or more storage devices, one or more communications ports for communicating with external devices, as well as various input and output (I/O) devices 110, such as a keyboard 114, the touchpad 118, a mouse 116, a headset, a stylus, a video/graphic display device 112, or any combination thereof. Portions of an information handling system 100 may themselves be considered information handling systems 100.

Information handling system 100 may include devices or modules that embody one or more of the devices or execute instructions of firmware or software application as well as for the one or more systems and modules described herein, and operates to perform one or more of the methods described herein such as a battery-integrated antenna management system. The information handling system 100 may execute code instructions 124 that may operate on servers or systems, remote data centers, or on-box in individual client information handling systems according to various embodiments herein. In some embodiments, it is understood any or all portions of code instructions 124 may operate on a plurality of information handling systems 100.

The information handling system 100 may include a processor 102 such as a central processing unit (CPU), controller, embedded controller (EC) 132, antenna controller 140, control logic or some combination of the same. Any of the processing resources may operate to execute code that is either firmware or software code of code instructions 124. Moreover, the information handling system 100 may include memory such as main memory 104, static memory 106, drive unit 160 (volatile (e.g., random-access memory, etc.), nonvolatile memory (read-only memory, flash memory etc.), or other memory of computer readable medium 122 storing instructions (e.g., software algorithms), parameters, and profiles 124 executable by the antenna controller 140, embedded controller 132, or any other processing device (e.g., processor 102). The information handling system 100 may also include one or more buses 108 operable to transmit communications between the various hardware components such as any combination of various input and output (I/O) devices as well as between processors 102, the embedded controller 132, the OS 138, the BIOS 136, the wireless interface adapter 120 the antenna module 130, and the power management unit (PMU) 110, among other components described herein.

The information handling system 100 may further include a video/graphics display device 112. The video/graphics display device 112 in an embodiment may function as a liquid crystal display (LCD), an organic light emitting diode (OLED), a flat panel display, or a solid-state display. Additionally, the information handling system 100 may include an I/O device 110 that allows the user to interface with the information handling system 100 via the video/graphics display device 112, such as a cursor control device (e.g., the mouse 116, touchpad 118, or gesture or touch screen input), and the keyboard 114 or stylus, among others. Various drivers and control electronics may be operatively coupled to operate the I/O devices 110 according to the embodiments described herein.

The network interface device in FIG. 1 is shown as wireless interface adapter 120 but may also be a wired network interface device as is understood in the art and may provide connectivity to a network 134, e.g., a wide area network (WAN), a local area network (LAN), wireless local area network (WLAN), a wireless personal area network (WPAN), a wireless wide area network (WWAN), or other network. The network interface device shown as wireless interface adapter 120 may provide connectivity to a network 134 via operation of a WLAN radio and WLAN antenna front end and/or a WWAN radio and WWAN antenna front end being controlled by an antenna controller 140. It is appreciated that any number of radios and RF front ends may be associated with a plurality of antennas within the information handling system and may operate under any wireless protocol described herein. In an embodiment, an antenna module 130 operatively coupled to the housing of the battery 126 may include an antenna 162 as well as a front end. In an alternative embodiment, the antenna module 130 coupled to the battery housing 142 may include an antenna 162 and front end, with the radio of the wireless interface adapter 120 operatively coupled to the antenna 162 via a cable array. Connectivity to a network 134 may be via wired or wireless connection. The wireless interface adapter 120 may operate in accordance with any wireless data communication standards. To communicate with a wireless local area network, standards including IEEE 802.11 a/h/j/n/ac/ax WLAN standards, IEEE 802.15 WPAN standards, WWAN such as 3GPP or 3GPP2, or similar wireless standards may be used. In some aspects of the present disclosure, one wireless interface adapter 120 may operate two or more wireless links. Information handling systems 100 including those that are mobile in embodiments of the present disclosure may employ a plurality of antenna systems for communication via wireless links operating on a variety of radio access technologies (RAT). For example, a mobile information handling system in an embodiment of the present disclosure may employ separate antenna systems for Wi-Fi signals, wireless wide area network (WWAN) signals, Bluetooth signals, and wireless local area network (WLAN) signals. WWAN signals in embodiments of the present disclosure may include 2G standards such as GSM, 2.5G standards such as GSM EDGE and GPRS, 3G standards such as W-CDMA/UMTS and CDMA 2000, 4G standards such as LTE, LTE-A, LTE-LAA, 5G standards, emerging 6G standards, or WiMAX, small cell WWAN, and the like. Wi-Fi and WLAN signals in embodiments of the present disclosure may include wireless links adhering to standards such as, for example, IEEE 802.11 WiFi, IEEE 802.11ad WiGig, IEEE 802.15 WPAN, and IEEE 802.11ax-2021 (e.g., WiFi 6 and 6E, 6 GHz technologies). In other aspects, several antenna systems may be available for each RAT to enable aggregated data communications such as via plural multiple in, multiple out (MIMO) streams (e.g., Wi-Fi MIMO or cellular MIMO) to enhance data bandwidth or reliability. In some examples, an information handling system may support multi-RAT radios (4G, 5G, WLAN) that require simultaneous transmission using multiple antennas to support various modes of transmission (e.g., uplink (UL) MIMO and 5G E-UTRAN new radio (EN-DC)). With 5G technology, these information handling systems may use, in an example embodiment, sub-6 GHz antennas and mmWave antennas, WLAN antennas, resulting in several antennas, and which 4 transmit to support EN-DC mode, or antennas concurrently transmit during an UL MIMO operation in the information handling system.

Wireless interface adapter 120 may connect to any combination of macro-cellular wireless connections including 2G, 2.5G, 3G, 4G, 5G or the like from one or more service providers or privately administered network providers. Wireless interface adapter 120 may also connect to any WLAN networks such as Wi-Fi networks. Utilization of radiofrequency communication bands according to several example embodiments of the present disclosure may include bands used with the WLAN standards and WWAN carriers, which may operate in both licensed and unlicensed spectrums.

In some embodiments, software, firmware, dedicated hardware implementations such as application specific integrated circuits, programmable logic arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations may include distributed processing, component/object distributed processing, and parallel processing. Alternatively, virtual computer system processing may be constructed to implement one or more of the methods or functionalities as described herein.

The present disclosure contemplates a computer-readable medium that includes instructions, parameters, and profiles 124 or receives and executes instructions, parameters, and profiles 124 responsive to a propagated signal, so that a device connected to a network 134 may communicate voice, video or data over the network 134. Further, the instructions 124 may be transmitted or received over the network 134 via the network interface device or wireless interface adapter 120.

The information handling system 100 may include a set of instructions 124 that may be executed to cause the computer system to perform any one or more of the methods or computer-based functions disclosed herein. For example, instructions 124 may be executed by an antenna controller 140 and an EC 132 or other controller operating as a charging scheduling controller, and may include software agents, or other aspects or components used to execute the methods and systems described herein. Various software modules comprising application instructions 124 may be coordinated by an operating system (OS), and/or via an application programming interface (API). An example operating system may include Windows®, Android®, and other OS types. Example APIs may include Win 32, Core Java API, or Android APIs. Additionally, execution of the instructions described herein may be via execution of firmware by the antenna controller 140 and/or embedded controller 132, PMU 164, and/or other controller or control logic in various embodiments.

The disk drive unit 116 may include a computer-readable medium 122 in which one or more sets of instructions 124 such as software may be embedded and executed by the antenna controller 140, processor 102, and/or embedded controller 132, in an embodiment. Similarly, main memory 104 and static memory 106 may also contain a computer-readable medium for storage of one or more sets of instructions, parameters, or profiles 124. The disk drive unit 116 and static memory 106 may also contain space for data storage. Further, the instructions 124 may embody one or more of the methods or logic as described herein. For example, instructions relating to and executed by the antenna controller 140, embedded controller 132, processor 102, software algorithms, processes, and/or methods may be stored locally. In a particular embodiment, the instructions, parameters, and profiles 124 may reside completely, or at least partially, within the main memory 104, a static memory 106, and/or within a disk drive 116 during execution by the processor 102 of information handling system 100. As explained, some or all of the instructions 124 to be executed by a processor 102 for software applications may be executed locally, remotely or a combination thereof. The main memory 104 and the processor 102 also may include computer-readable media.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The computer executable instructions 124 to be executed by the antenna controller 140, processor 102, embedded controller 132 or at PMU 164 may be stored in static memory 106, or the drive unit 160 on a computer-readable medium 122 such as a flash memory or magnetic disk in an example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random-access memory or other volatile re-writable memory. Additionally, the computer-readable medium may include a magneto-optical or optical medium, such as a disk or tapes or other storage device to store information received via carrier wave signals such as a signal communicated over a transmission medium. Furthermore, a computer readable medium may store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In other embodiments, dedicated hardware implementations such as application specific integrated circuits, programmable logic arrays and other hardware devices may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein may be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The system, device, controller, or module may include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module may also include a combination of the foregoing examples of hardware or software. In an embodiment an information handling system 100 may include an integrated circuit or a board-level product having portions thereof that may also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another may communicate directly or indirectly through one or more intermediaries.

As described herein, the information handling system 100 may further include a power management unit (PMU) 164 (a.k.a. a power supply unit (PSU)). The PMU 164 may manage the power provided to the components of the information handling system 100 such as the processor 102, a cooling system, one or more drive units 160, a graphical processing unit (GPU), a video/graphic display device 112 or other I/O device 110 such as the stylus, and other components that may require power when a power button has been actuated by a user. In an embodiment, the PMU 164 may monitor power levels and be electrically coupled to the information handling system 100 to provide this power and coupled to bus 108 to provide or receive data or instructions. The PMU 164 may regulate power charging of the battery cells 146-1 through 146-N of a battery 126 from a power source such as A/C power adapter 128. In an embodiment, the battery 126 may be charged via the A/C power adapter 128 or may discharge to provide power to the components of the information handling system 100 via wired connections as applicable, such as when A/C power from the A/C power adapter 128 is removed.

As described herein, the information handling system 100 includes an antenna module 130 operatively coupled to a battery housing 142 of the battery 126. The antenna module 130 may include an antenna 162 (e.g., WLAN, WWAN, mmWave) used to operatively and wirelessly couple the information handling system 100 to the network 134 in order to transmit and receive data. As described herein, the data may include data processed on behalf of the processor 102 of the information handling system 100 and may be arranged to provide cloud computing for the information handling system 100. As such, the antenna module 130 may include an antenna 162 that operates a relatively higher frequencies in order to transmit and receive the relatively larger amounts of data. For example, the user may be operating the information handling system 100 in order to engage in an online gaming application. The execution of the online game at the information handling system 100 by the processor 102 may include offloading the processing of data to a data processing resource at the network 134 thereby reducing the processing needs at the information handling system 100. This may require larger amounts of data to be transmitted by the antenna 162. Accordingly, the higher data transmission rates at the relatively higher frequencies may result in higher temperatures at the antenna 162. To prevent overheating and control the dissipation of the heat produced by the operation of the antenna 162 at the antenna module 130, the antenna module 130 is operatively coupled to the battery 126 to sink the heat into the cooling system associated with that battery 126.

The battery 126 itself may also produce an amount of heat depending on the charging rate and discharging rate of the power cells 146-1, 146-N within the battery 126. Power cells 146-1 through 146-N may also be referred to as battery cells herein. This heat may be absorbed, in an embodiment by a thermal mitigation structure 144 or other thermal displacement mechanisms. In an embodiment, the thermal displacement mechanisms may include an aerogel formed around each of the power cells 146-1, 146-N and placed between the power cells 146-1, 146-N and the antenna module 130 formed on the battery housing 142 of the battery 126. This aerogel may be capable of absorbing and insulating an amount of heat from the charging and discharging processes associated with the power cells 146-1, 146-N as well as the heat created by the operation of the antenna module 130 (e.g., as the antenna module 130 transmits data). In an embodiment, the battery 126 may further include a thermal mitigation structure 144 placed near the power cells 146-1, 146-N of the battery 126 and the antenna module 130. This thermal mitigation structure 144 may be in addition to the thermal displacement mechanisms already placed within the battery 126 or battery housing 142 described herein. In an embodiment, the thermal mitigation structure 144 may be a vapor chamber placed between the power cells 146-1, 146-N and the antenna module 130. A vapor chamber, in an example embodiment, may include a sealed sheet, pipe, or other structure with a working fluid therein. As the vapor chamber receives heat from a source such as the antenna module 130 and/or the power cells 146-1, 146-N, the working fluid may absorb that heat and move from one state to another (e.g., liquid state into a gas state) as the temperature changes. In another example embodiment, the thermal mitigation structure 144 may include a thin layer of the aerogel around the power cells 146-1, 146-N as described herein. In still another example embodiment, the thermal mitigation structure 144 may be a heat pipe operatively coupled to an active or passive cooling system within the information handling system 100. In this embodiment the heat pipe may receive an amount of heat from the operations of the power cells 146-1 through 146-N or antenna module 130 (with the antenna 162) and transmit that heat to the cooling system already present within the housing of the information handling system 100 for dispersion passively or via, for example, a cooling fan. In another example embodiment, the thermal mitigation structure 144 may be a graphite layer placed between the power cells 146-1, 146-N of the battery 126 and the antenna module 130. In this embodiment, the graphite layer (e.g., graphite sheet or film) may absorb an amount of heat and dissipate that heat out and away from the battery 126.

The thermal mitigation structure 144 and other thermal displacement mechanisms described herein, however, may have a limit at to how much heat that can be absorbed and the rates of heat dissipation. The systems and methods described herein describe a battery with a battery-integrated antenna module 130 and a controller operating a battery-integrated antenna management system that is capable of either throttling the radiofrequency transmission or transception at the antenna module 130 or throttling the charging/discharging rates of the battery 126 in order to keep the temperatures at the battery 126 from exceeding the capacity of the thermal mitigation structure 144 or thermal displacement mechanisms of the battery housing 142 to dissipate that heat. This further prevents the heat from damaging the power cells 146-1, 146-N within the battery 126 and the components of the antenna module 130. Via execution of the methods on the systems described herein, the temperature of the antenna module 130, the temperature of the power cells 146-1, 146-N or the battery 126 as a whole, and certain operating parameters of the information handling system 100 may be considered and used as input to a charge scheduling or wireless scheduling controller (e.g., the embedded controller 132, the processor 102, an antenna controller 140, or PMU 164) in order to determine whether throttling the charging/discharging rates of the battery 126 should occur and/or whether throttling the transmission or transception of radio frequencies (RF) at the antenna module 130 should occur.

During operation, a controller or processing device may receive data descriptive of the operating parameters of an antenna module. This controller may be one of the embedded controller 132, the processor 102, the antenna controller 140 or a combination of these controllers ad processing devices. The operating parameters include, in one embodiment, the wireless protocol under which the antenna 162 of the antenna module 130 is being operated. For example, where the antenna 162 is being used as a mmWave antenna operating at, for example, new radio frequency range 1 (FR1) or FR2, the antenna controller 140 may provide this operating parameter data to the controller responsible for throttling either the battery 126 or antenna module 130 as described herein. The operating parameters may further include data describing, in one example embodiment, the type of application or applications being executed on the information handling system 100.

For example, where the information handling system 100 is executing an email application, the data transmission and reception requirements at the antenna module 130 may be low relative to other types of data throughput-intensive applications such as an online gaming application. Indeed, where the information handling system 100 is executing an online gaming application, the data throughput requirements may be significantly more than other executing applications and this higher data throughput may be extended for long periods of time while the user is engaged with the application. Where these relatively higher data throughput applications (e.g., online gaming applications, videoconferencing applications, video streaming applications) are being executed, the controller or controllers operating the battery-integrated antenna management system may give preference to the operation of the antenna module 130 over, in an example embodiment, the charging/discharging rate of the battery 126. Here, the controller may throttle the charging/discharging rates of the battery 126 so that the heat produced by the battery 126 does not overwhelm the thermal absorption capabilities of the thermal displacement mechanisms and thermal mitigation structure 144 within the battery 126. It is appreciated that other operating parameters may be provided to the controller operating the battery-integrated antenna management system to determine whether to prioritize the charging/discharging rate of the battery 126 or the RF transmission or transception at the antenna module 130.

The controller executing the battery-integrated antenna management system, such as the embedded controller 132, may further receive temperature data from both the battery temperature sensor 150 and the antenna module temperature sensor 152. The battery temperature sensor 150 may be any sensor capable of detecting a real-time temperature within the battery 126 and may be placed at any location within the battery 126. The antenna module temperature sensor 152 may be any sensor capable of detecting a real-time temperature of the antenna module 130 and may be placed near or on the antenna module 130. Each of the antenna module temperature sensor 152 and battery temperature sensor 150 may provide temperature data to the controller.

In an embodiment, the controller executing the battery-integrated antenna management system may further receive power data descriptive of the charging and discharging of the battery 126 in real time. This power data may be requested by the controller or provided to the controller periodically by the battery 126 in order to provide a current charge of the power cells 146-1, 146-N and a predicted duration of time when the battery 126 will be depleted at current discharging rates. In an embodiment, the PMU 164 may gather this data and provide it to the controller. The PMU 164 may communicate with the processor 102 in order to determine the processes and processing resources consumed by the processor 102 in order to provide that data to the controller as additional operating parameters used by the controller to determine if and when to throttle the charging/discharging rates of the battery 126 and/or throttle the transceptions at the antenna module 130.

In an embodiment, the controller executing the battery-integrated antenna management system that receives the operating parameters, power data, and detected temperature data as described herein is the embedded controller 132. In this embodiment, the embedded controller (EC) 132 may execute a driver or other software/firmware associated with controlling the throttling of the charging/discharging rates of the battery 126 and the throttling of the RF transmission or transception at the antenna module 130. Alternatively, the driver may be a standalone driver maintained on any memory storage device and executed by any processing device within the information handling system. In an embodiment, the execution of the driver may be independent of the operations of the OS 138 and BIOS 136.

In the embodiment where the EC 132 executes the driver or other software or firmware, the EC 132 may be responsible for receiving the detected temperature data, the operating parameters, and the power data as described herein and using this data as input to an algorithm or to implement a look-up table of the battery-integrated antenna management system. In one embodiment, the algorithm may include a trained neural network used to determine whether to throttle the RF transmission or transception at the antenna module 130 or throttle the charging/discharging rates of the battery 126. This trained neural network may be trained at, for example, a server located on the network 134 and provided to the information handling system 100 in a trained state. The training of the neural network may be completed by the server after receiving a set of operating parameters, power data, and detected temperature data from one or more information handling systems 100 operatively coupled to the server. In an embodiment, the trained neural network may be a layered feedforward neural network having an input layer with nodes for gathered detected temperature data, operating parameters, and power data as described herein. For example, the neural network may comprise a multi-layer perceptron neural network executed using the Python® coding language. Other types of multi-layer feed-forward neural networks are also contemplated, with each layer of the multi-layer network being associated with a node weighting array describing the influence each node of a preceding layer has on the value of each node in the following layer.

In the embodiment where the EC 132 uses a look-up table, the EC 132 may cross-reference the received, real-time, detected temperature data, operating parameters, and power data to determine whether to throttle the RF transmission or transception at the antenna module 130 and/or throttle the charging/discharging rates of the battery 126. In an embodiment, and based on the operating parameters, the EC 132 may prioritize the operations of one of the antenna module 130 and antenna 162 over the battery 126 or visa-versa. In the embodiment where a high data-through-put application is being executed such as a video streaming application, the EC 132 may prioritize the operation of the antenna module 130 over the battery 126. Alternatively, or additionally, where the battery 126 has reached a threshold battery 126 depletion level, the EC 132 may prioritize the operations (e.g., charging) of the battery 126 over the antenna module 130. In an example embodiment, the threshold battery 126 depletion level is 30%. If and when this threshold battery 126 depletion level is reached, the EC 132 may switch from prioritizing the antenna module 130 over the battery 126 to prioritizing the battery 126 over the antenna module 130. When this occurs, the antenna module 130 may operate the antenna 162 using a different protocol such as a 4G LTE protocol. In another example embodiment, where the battery 126 depletion level is 80%, this may serve as an upper threshold indicating to the EC 132 or other controller that the charging of the battery may be throttled in order to give preference to the operations of the antenna module 130 and provide for protentional heat increases at the antenna module 130 rather than the power cells 146-1, 146-N of the battery 126 to be mitigated by the heat pipe or other cooling structures of the battery housing 142.

Similarly, the prioritization of the battery 126 relative to the antenna module 130 may be dependent on the detected temperature data received from the antenna module temperature sensor 152 and battery temperature sensor 150. In an example embodiment, where the temperature of the battery 126 or antenna module 130 exceeds a threshold temperature, one or both of the operations of the battery 126 or the antenna module 130 may be throttled in order to reduce the temperature(s) and prevent damage to either of the battery 126 or antenna module 130. The threshold temperature may be any temperature and may set based on the thermal disbursement capabilities of the thermal mitigation structure 144 and thermal displacement mechanisms of the battery housing 142 and the temperature susceptibilities of the power cells 146-1, 146-N and antenna module 130 among other physical characteristics of the systems described herein.

In an embodiment, the PMU 164 may provide charging/discharging data to the EC 132 for the EC 132 to use to determine an expected temperature of the battery 126. In this embodiment, the EC 132 may have a look-up table that is used to cross-reference this charging/discharging data to determine expected temperatures within the battery 126. This may be an alternative to implementing a battery temperature sensor 150 to determine the temperature of the battery 126 in an embodiment. In an alternative embodiment, the use of this look-up table may be supplemented with the temperature data received from the battery temperature sensor 150 to confirm the temperature, in real-time, at the battery 126 and predict temperature changes within the battery 126 as the charging/discharging of the battery 126 occurs.

The throttling of the charging/discharging rates of the battery 126 and the throttling of the RF transmission or transception at the antenna module 130 may also be dependent on an operating parameter related to whether the information handling system 100 is operating via an A/C power supply at the A/C power adapter 128 or via the power supply of the power cells 146-1, 146-N in the battery 126. Where an A/C power supply is being used, the charging/discharging rate of the power cells 146-1, 146-N may be placed in a secondary status relative to the operations of the antenna module 130 such that the throttling of the charging/discharging rates of the battery 126 is conducted in those situations where the antenna module 130 is to be engaged in relatively high data-throughput operations in a persistent connectivity scenario, for example. In an embodiment, when the A/C power is being used the charging rate of the power cell 146-1 through 146-N may be at secondary status relative to the antenna 162 only after the charge levels of the battery 126 reach a threshold level (e.g., 20%).

In an embodiment, the information handling system 100 may include an integrated sensor hub 158. The integrated sensor hub 158 may further include other sensors such as a Hall effect sensor, a magnetometer, a proximity sensor, a hinge sensor, a light sensor, and a camera, among other sensors. In an embodiment, these variety of sensors may also include an accelerometer, a gyroscope, an orientation sensor in addition to these other sensors. In an embodiment, the integrated sensor hub 158 may receive data from a battery temperature sensor 150 and antenna module temperature sensor 152 in order to provide that data to a controller such as the EC 132 or to a controller executing a driver responsible for determining whether to throttle the RF transmission or transception at the antenna module 130 and/or throttle the charging/discharging rates of the battery 126. In an embodiment, the integrated sensor hub 158 may detect the presence (e.g., operative coupling) of the battery 126 and the antenna module 130 in order to control the temperatures at the battery 126 and antenna module 130.

The information handling system 100 may include one or more of an operating system (OS) 138, and basic input/output system (BIOS) firmware/software 136 or application programs that may be executable instructions 124 executed at any processor 102 and stored at one or more memory devices 104, 106, or 116. BIOS firmware/software 136 functions to initialize the information handling system 100 on power up, to launch an OS 138, and to manage input and output interactions between the OS 138 and the other elements of information handling system 100 including the antenna module 130 and battery 126 described herein. In a particular embodiment, BIOS firmware/software 136 resides in memory 104, and include machine-executable code that is executed by processor 102 to perform various functions of information handling system 100 as described herein. In another embodiment (not illustrated), application programs and BIOS firmware/software 136 reside in another storage medium of the information handling system 100. For example, application programs and BIOS firmware/software 110 can reside in drive unit 160, in a ROM (not illustrated) associated with the information handling system 100, in an option-ROM (not illustrated) associated with various devices of the information handling system 100, in a storage system (not illustrated) associated with network channel of a wireless interface adapter 120, in another storage medium of the information handling system 100, or a combination thereof. Executable code instructions 124 for application programs and BIOS firmware/software 136 can each be implemented as single programs, or as separate programs carrying out the various features as described herein.

Figure 2:
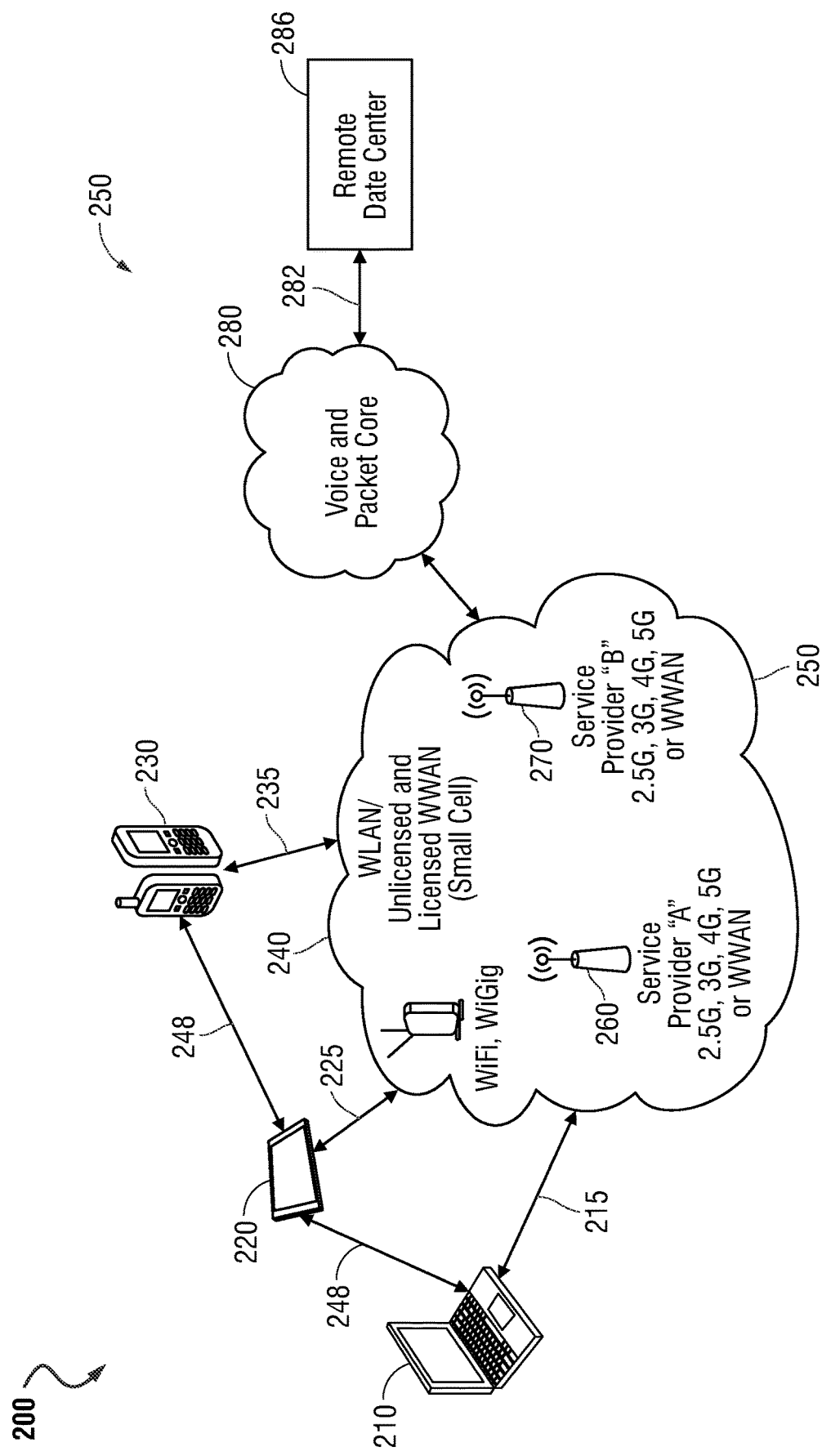
FIG. 2 is a block diagram of a network environment offering several communication protocol options and mobile information handling systems according to an embodiment of the present disclosure.

FIG. 2 illustrates a network 200 that can include one or more endpoint devices 210, 220, 230. The endpoint devices 210, 220, 230 shown in FIG. 2 may be similar to the information handling system 100 described in connection with FIG. 1. In a particular embodiment, network 200 includes networked mobile endpoint devices 210, 220, 230, wireless network access points, and multiple wireless connection link options. A variety of additional computing resources of network 200 may include client mobile information handling systems, data processing servers, network storage devices, local and wide area networks, a RAN service provider, or other resources as needed or desired. As partially depicted, endpoint devices 210, 220, 230 may be a laptop computer, tablet computer, 360-degree convertible systems, wearable computing devices, or a smart phone device. These mobile endpoint devices 210, 220, 230, may access a wireless local network 240, or they may access a macro-cellular network 250. For example, the wireless local network 240 may be the wireless local area network (WLAN), a wireless personal area network (WPAN), or a wireless wide area network (WWAN). In an example embodiment, LTE-LAA WWAN may operate with a small-cell WWAN wireless access point option. In an embodiment, these networks may provide cloud computing resources for the individual mobile endpoint devices 210, 220, 230.

Since WPAN or Wi-Fi Direct connection 248 and WWAN networks can functionally operate similar to WLANs, they may be considered as wireless local area networks (WLANs) for purposes herein. Components of a WLAN may be connected by wireline or Ethernet connections to a wider external network such as a voice and packet core 280. For example, wireless network access points or base stations may be connected to a wireless network controller and an Ethernet switch similar to that described in connection with FIG. 1. Wireless communications across wireless local network 240 may be via standard protocols such as IEEE 802.11 Wi-Fi, IEEE 802.11ad WiGig, IEEE 802.15 WPAN, IEEE 802.11ax-2021, (e.g., Wi-Fi 6 and 6E, 6 GHz technologies), or 5G small cell WWAN communications such as gNodeB, eNodeB, or similar and future wireless network protocols and access points. Alternatively, other available wireless links within network 240 may include macro-cellular connections 250 via one or more service providers 260 and 270. Again, as described herein, the organization of a number of endpoint devices 210, 220, 230 may be defined by the endpoint devices 210, 220, 230 accessing a specific or number of specific base stations. As described herein, the endpoint devices 210, 220, 230 may be operatively coupled to any of the macro-cellular connections 250 via one or more service providers 260 and 270 or to the wireless local area networks (WLANs) selectively. Service provider macro-cellular connections may include 2G standards such as GSM, 2.5G standards such as GSM EDGE and GPRS, 3G standards such as W-CDMA/UMTS and CDMA 2000, 4G standards, or emerging 5G standards including WiMAX, LTE, and LTE Advanced, LTE-LAA, small cell WWAN, upcoming 3GPP protocols, and the like.

Wireless local network 240 and macro-cellular network 250 may include a variety of licensed, unlicensed or shared communication frequency bands as well as a variety of wireless protocol technologies ranging from those operating in macrocells, small cells, picocells, or femtocells. As described herein, utilization of RF communication bands according to several example embodiments of the present disclosure may include bands used with the WLAN standards and WWAN carriers which may operate in both licensed and unlicensed spectrums. For example, both WLAN and WWAN may use the Unlicensed National Information Infrastructure (U-NII) band which typically operates in the ~5 MHz frequency band such as 802.11 a/h/j/n/ac/ax (e.g., center frequencies between 5.170-7.125 GHZ). WLAN, for example, may operate at a 2.4 GHz band, 5 GHz band, and/or a 6 GHz band according to, for example, Wi-Fi, Wi-Fi 6, or Wi-Fi 6E standards. WWAN may operate in a number of bands, some of which are proprietary but may include a wireless communication frequency band. For example, low-band 5G may operate at frequencies similar to 4G standards at 600-850 MHz or, in an embodiment, 960 Mhz. Mid-band 5G may operate at frequencies in an FR1 range between 1.8 and 6 GHz. Additionally, high-band 5G frequencies may operate at 25 to 39 GHz and even higher. In additional examples, WWAN carrier licensed bands may operate at the new radio frequency range 1 (NRFR1), NRFR2, bands, and other known bands as described herein per the operation of the converged 5G antenna. Each of these frequencies used to communicate over the network 240 may be based on the radio access network (RAN) standards that implement, for example, eNodeB or gNodeB hardware connected to mobile phone networks (e.g., cellular networks) used to communicate with the endpoint devices 210, 220, 230. In the example embodiment, mobile endpoint devices 210, 220, 230 may also include both unlicensed wireless RF communication capabilities as well as licensed wireless RF communication capabilities. For example, licensed wireless RF communication capabilities may be available via a subscriber carrier wireless service operating the cellular networks. With the licensed wireless RF communication capability, an WWAN RF front end of the endpoint devices 210, 220, 230 may operate on a licensed WWAN wireless radio with authorization for subscriber access to a wireless service provider on a carrier licensed frequency band. WLAN such as Wi-Fi (e.g., Wi-Fi 6) may be unlicensed.

In some embodiments according to the present disclosure, a networked mobile endpoint device 210, 220, 230 may each have a plurality of wireless network interface systems or radio protocol subsystems capable of transmitting simultaneously within several communication bands or even utilizing a shared communication frequency band access multiple protocols. That communication within a shared communication frequency band may be sourced from different protocols on parallel wireless network interface systems or from a single wireless network interface system capable of transmitting and receiving from multiple protocols. Similarly, a single antenna or the plurality of antennas in each endpoint device 210, 220, 230 may be used on each of the wireless communication devices such as according to embodiments herein and may be suited to plural RF bands. As described herein, each of the endpoint devices 210, 220, 230 may include a 5G antennas that are capable of transmitting and receiving data using an FR1 and FR2 frequency concurrently to communicate with multiple networks. Example competing protocols may be local wireless network access protocols such as Wi-Fi/WLAN, WiGig, and small cell WWAN in an unlicensed, shared communication frequency band. Within local portion of wireless network 250 access points for Wi-Fi or WiGig as well as small cell WWAN connectivity may be available in emerging 5G technology. This may create situations where a plurality of antenna systems are operating on an endpoint device 210, 220, 230 via concurrent communication wireless links on both WLAN and WWAN radios and antenna systems. In some embodiments, concurrent wireless links may operate within the same, adjacent, or otherwise interfering communication frequency bands and may be required to utilize spaced antennas thus limiting further available antenna locations and causing some antennas to be placed proximate to charging coils on the information handling system 100. The antenna may be a transmitting antenna that includes high-band, medium-band, low-band, and unlicensed band transmitting antennas in embodiments herein. The antenna may cooperate with other antennas in a N×N MIMO (where "N" is any number) array configuration according to the embodiments described herein. Alternatively, embodiments may include a single transceiving antennas capable of receiving and transmitting, and/or more than one transceiving antennas. Each of the antennas included in the endpoint devices 210, 220, 230 in an embodiment may be subject to the FCC regulations on specific absorption rate (SAR).

The voice and packet core network 280 shown in FIG. 2 may contain externally accessible computing resources and connect to a remote data center 286. The voice and packet core network 280 may contain multiple intermediate web servers or other locations with accessible data (not shown). The voice and packet core network 280 may also connect to other wireless networks similar to 240 or 250 and additional mobile endpoint devices 210, 220, 230 or similar connected to those additional wireless networks. Connection 282 between the wireless network 240 and remote data center 286 or connection to other additional wireless networks may be via Ethernet or another similar connection to the world-wide-web, a WAN, a LAN, another WLAN, or other network structure. Such a connection 282 may be made via a WLAN access point/Ethernet switch to the external network and be a backhaul connection. The access point may be connected to one or more wireless access points in the WLAN before connecting directly to a mobile information handling system or may connect directly to one or more mobile endpoint devices 210, 220, 230. Alternatively, mobile endpoint devices 210, 220, 230 may connect to the external network via base station locations at service providers such as 260 and 270. These service provider locations may be network connected via backhaul connectivity through the voice and packet core network 280.

Remote data centers 286 may include web servers or resources within a cloud environment that operate via the voice and packet core 280 or other wider internet connectivity. For example, remote data centers can include additional information handling systems, data processing servers, network storage devices, local and wide area networks, or other resources as needed or desired. In an embodiment, the remote data center 286 may include one or more servers. In another embodiment, the on-demand network slice overlay optimization system 201 may be directly accessible by the endpoint devices 210, 220, 230 via the one or more networks. Having such remote capabilities may permit fewer resources to be maintained at the mobile endpoint devices 210, 220, 230 allowing streamlining and efficiency within those devices. Similarly, remote data center permits fewer resources to be maintained in other parts of network 200. Thus, high data bandwidth wireless links are desired for endpoint devices 210, 220, 230 to interface with greater and greater resources located on a network edge or at a remote data center. This requires more antennas, more power, and more heat, in less space within the endpoint devices 210, 220, 230.

Although network connections 215, 225, and 235 are shown connecting wireless adapters of mobile endpoint devices 210, 220, 230 to wireless networks 240 or 250, a variety of wireless links are contemplated. Wireless communication may link through a wireless access point (Wi-Fi or WiGig), through unlicensed WWAN small cell base stations such as in network 240 or through a service provider tower and base stations such as that shown with service provider A 260 or service provider B 270 and in network 250. In other aspects, mobile endpoint devices 210, 220, 230 may communicate intra-device via intra-device connections 248 when one or more of the mobile endpoint devices 210, 220, 230 are set to act as an access point or even potentially an WWAN connection via small cell communication on licensed or unlicensed WWAN connections. For example, one of the endpoint devices 210, 220, 230 may serve as a Wi-Fi hotspot in an embodiment. Concurrent wireless links to the endpoint devices 210, 220, 230 may be connected via any access points including other mobile information handling systems as illustrated in FIG. 2.

Figure 3:
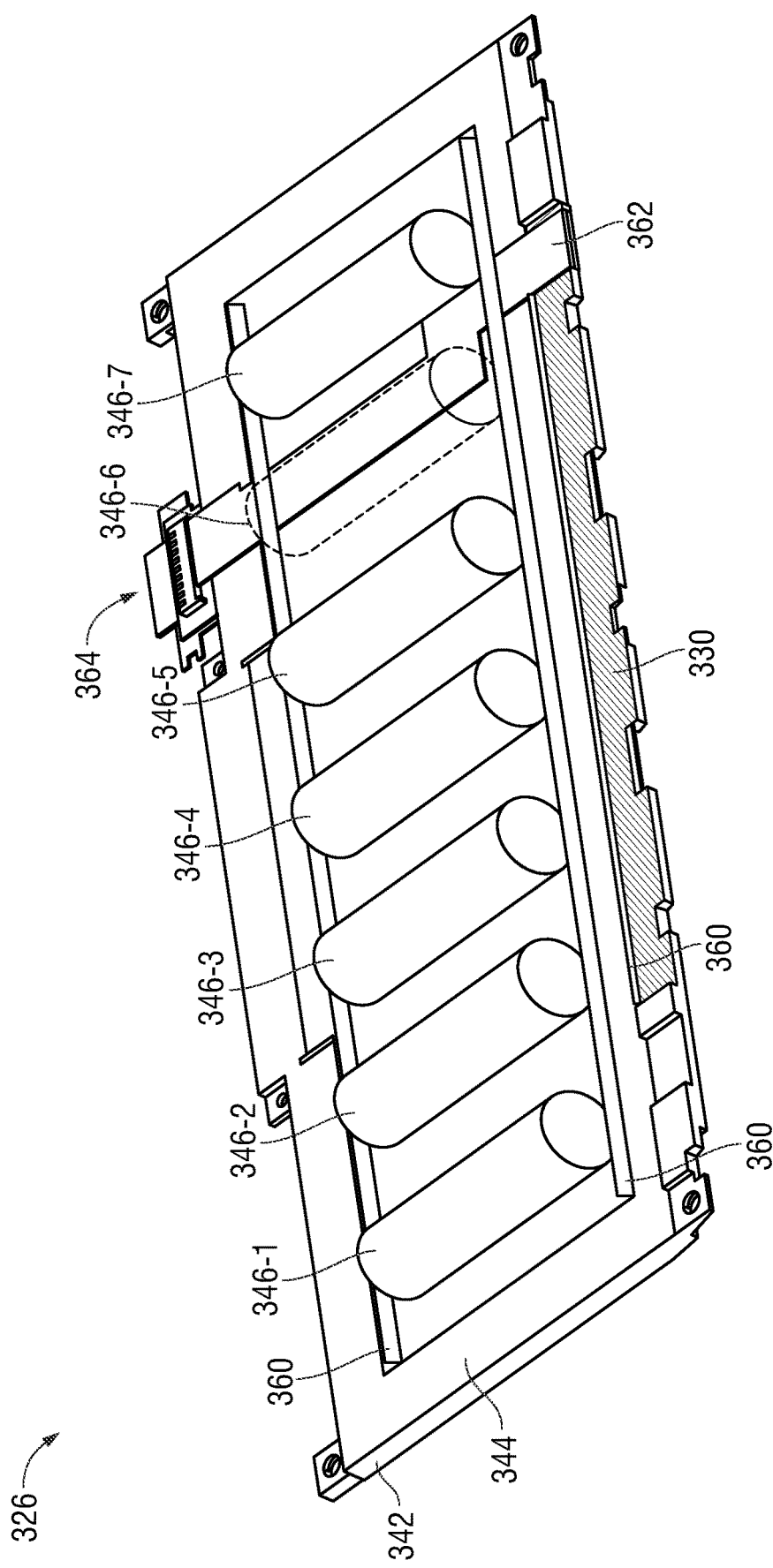
FIG. 3 is a graphic diagram of a battery with a battery-integrated antenna module according to an embodiment of the present disclosure.

FIG. 3 is a graphic diagram of a battery housing 326 with a battery-integrated antenna module 330 according to an embodiment of the present disclosure. As described herein, the battery housing 326 may be operatively coupled to the information handling system described in connection with FIG. 1. In an embodiment, the battery housing 326 may be physically coupled within the housing of the information handling system in a permanent or semi-permanent fashion. In an embodiment, the coupling of the battery housing 326 to the housing of the information handling system may electrically and communicatively couple the battery housing 326 to a bus, a PMU, or the controllers described herein. This electrical and communication coupling of the battery housing 326 to these systems may be accomplished via an electrical connection such as a board-to-board connector 364 shown in FIG. 3. In an example embodiment, the antenna module 330 may also be operatively coupled to these systems using the board-to-board connector 364. In an alternative example embodiment, the board-to-board connector 364 may operatively couple the antenna module 330 to these systems while the battery 326 is electrically and communicatively coupled to these systems via another connector or connection path.

The battery housing 326 shown in FIG. 3 includes a plurality of power cells 346-1 through 346-7. The number of power cells 346-1 through 346-7 shown are meant as an example and the present specification contemplates that more or less power cells 346-1 through 346-7 may be arranged within the battery housing tray 342. Additionally, the present specification contemplates that the physical arrangement of distance between the power cells 346-1 through 346-7 may be different than the arrangement and distances shown in FIG. 3. In other words, power cells 346-1 through 346-7 may be packed in any arrangement, or orientation in various embodiments. Further, power cells 346-1 through 346-7 may be arranged serially, in parallel or both some combination according to various embodiments in the art. FIG. 3 also shows a sixth power cell 346-6 in ghost (dashed lines) in order to show the flexible cable array 362 over or through the battery housing tray 342 of the battery housing 326. Each of these power cells 346-1 through 346-7 may be operatively coupled to a PMU, a controller, or any other system within the information handling system as described herein. Although FIG. 3 shows the placement of the power cells 346-1 through 346-7, the present specification contemplates that the arrangement of these power cells 346-1 through 346-7.

The battery housing tray 342 may contain the power cells 346-1 through 346-7 via a second housing half (i.e., a top or lid) that fits over the battery housing tray 342 shown in FIG. 3 in an example, embodiment. This battery housing tray 342 may also contain a thermal displacement mechanism 360 that surrounds the power cells 346-1 through 346-7 and provides at least one thermal mitigation structure between the power cells 346-1 through 346-7 and the antenna module 330. In an embodiment, this thermal displacement mechanism 360 may be an aerogel. The aerogel may be any synthetic porous material derived from a gel in which a liquid component of that gel has been replaced with a gas without significant collapse of the gel structure. In this embodiment, the aerogel may serve as a conductive insulator that does not allow the heat to reach the antenna module 330. In the embodiment shown in FIG. 3, the aerogel may be placed at locations within the battery housing 326 where a user could come in contact with the user or between the power cells 346-1 through 346-7 and a thermal mitigation structure 344. However, as the temperature increases, the capability of this aerogel to conduct the increasing levels of heat may be compromised such that the EC described herein may throttle the charging/discharging rates of the battery power cells 346-1 through 346-7 as described herein.

The battery housing 326 may also include a thermal mitigation structure 344 (e.g., thermal spreader or heat sink) also placed between the antenna module 330 and the power cells 346-1 through 346-7. This thermal mitigation structure 344 may conduct the transmission of the heat from the antenna module 330 or the power cells 346-1 through 346-7 away from the battery housing 326. Again, the capability of this thermal mitigation structure 344 to conduct the increasing levels of heat may be compromised such that the EC described herein may throttle the charging/discharging rates of the battery 326 and/or throttle the transceptions at the antenna module 330 as described herein.

In an embodiment, the thermal mitigation structure 344 may also be a vapor chamber placed between the power cells 346-1 through 346-7 and the antenna 330. A vapor chamber, in an example embodiment, may include a tubular and sealed, heat conductive pipe with a working fluid therein. As the vapor chamber receives heat from a source such as the antenna module 330 and/or the power cells 346-1 through 346-7 via the thermal displacement mechanism 360, the working fluid may absorb that heat and move from one state to another (e.g., liquid state into a gas state) as the temperature changes. In this embodiment, the vapor chamber thermal mitigation structure 344 may outline an external circumference of the battery housing 326 and may also extend outside of the battery housing 326 in order to provide for the condensation of the working fluid and thereby direct heat outside of the battery housing 326. In an embodiment, the capability of this vapor chamber to conduct the increasing levels of heat outside of the battery housing 326 may be compromised such that the EC described herein may throttle the charging/discharging rates of the battery 326 and/or throttle the transceptions at the antenna module 330 as described herein.

In an embodiment, the thermal mitigation structure 344 may be a heat pipe operatively coupled to a cooling system within the information handling system. In an embodiment, the heat pipe may be placed around a circumference of the battery housing 326 such that a portion of the heat pipe is placed between the antenna module 330 and the power cells 346-1 through 346-7. In this example embodiment, a portion of the heat pipe may extend out from the battery housing 342 and to a cooling system within the information handling system. In this embodiment the heat pipe may receive an amount of heat and transmit that heat to the cooling system for dispersion via, for example, a passive radiating device (e.g., metal fins) or a cooling fan. In an embodiment, the heat pipe may be part of or an extension of the cooling system within the information handling system. In this example embodiment, the battery housing 326 may be permanently formed into the housing of the information handling system.

In an embodiment, the thermal mitigation structure 344 may be a graphite layer placed around or at the power cells 346-1 through 346-7 of the battery housing 326 and the antenna module 330. In this embodiment, the graphite layer (e.g., graphite sheet or film) may absorb an amount of heat and dissipate that heat out and away from the battery 326. The graphite layer may be arranged so that heat from the power cells 346-1 through 346-7 and the antenna module 330 may be transmitted out and away from the battery housing 326.

In an embodiment, the thermal migration structure 344 may be a copper heat sink of any form, shape or size including a heat pipe as described herein. The copper heat sink or heat pipe may be made of copper which is relatively more thermally conductive than other materials used in the battery housing 326. As such, heat is sunk into the copper heat sink more readily than these other materials drawing heat out and away from the antenna 330 and the power cells 346-1 through 346-7.

In an embodiment, the thermal mitigation structure 344 may be or further include a thin layer of the aerogel 360 inside the battery housing 326 and running along antenna 330 as described herein. As described herein, the thin layer of aerogel 360 may serve as a conductive insulator that does not allow the heat to reach the antenna module 330. However, as the temperature increases, the capability of this aerogel to conduct the increasing levels of heat may be compromised such that the EC described herein may throttle the charging/discharging rates of the battery 326 and/or throttle the transceptions at the antenna module 330 according to the processes described herein.

As described herein, the battery housing 326 may further include a flexible cable array 362 that extends from the antenna module 330 to a board-to-board connector 364 used to operatively couple the antenna module 330 to a wireless interface adapter (e.g., FIG. 1, 120) and antenna controller (e.g., FIG. 1, 140). The flexible cable array 362 may also operatively couple the antenna module temperature sensor and/or battery temperature sensor to the integrated sensor hub (e.g., FIG. 1, 154) and/or controller (e.g., FIG. 1, EC 132) and to the PMU (e.g., FIG. 1, 164). As described herein, the temperature data obtained by the antenna module temperature sensor (not shown) and/or battery temperature sensor (not shown) is used, among other data, to throttle the charging/discharging rates of the battery 326 and/or throttle the transceptions at the antenna module 330 by a battery-integrated antenna management system.

Figure 4:
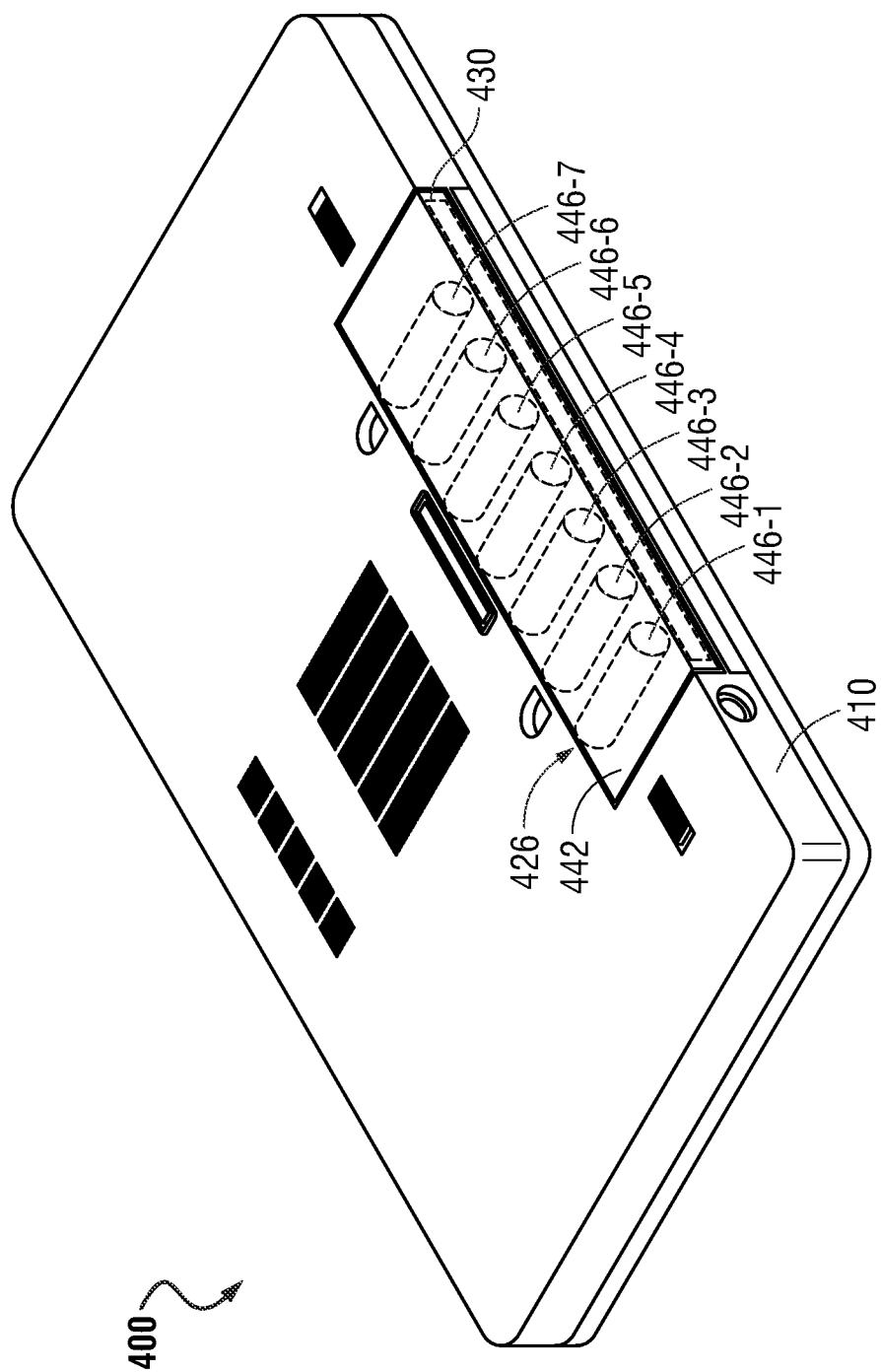
FIG. 4 is a graphic diagram of a bottom view of an information handling system and a battery with a battery-integrated antenna module according to another embodiment of the present disclosure.

FIG. 4 is a graphic diagram of a bottom view of an information handling system 400 and a battery housing 426 with a battery-integrated antenna module location 430 (referred to herein as the battery-integrated antenna module 430) according to another embodiment of the present disclosure. FIG. 4 shows a potential location where the battery housing 426 may be operatively coupled to the housing or chassis 410 of the information handling system 400 and, in this example embodiment, that location is to a base portion of a laptop-type information handling system 400 towards the back. The battery housing 426 also shows a potential location 430 (shown in dashed lines) where a battery-integrated antenna module may be placed within the battery housing 426 (referred to herein as the battery-integrated antenna module 430).

The position of the battery power cells 446-1 through 446-7 and the battery-integrated antenna module 430 within the battery housing 426 may be set based on the location of the battery-integrated antenna module 430 when the battery housing 426 is coupled to the information handling system 400. In this example embodiment shown in FIG. 4, the battery-integrated antenna module 430 is placed at a location (e.g., as shown with 430) that is closest to the side or an exterior portion of the chassis 410 of the information handling system 400. This may allow the battery-integrated antenna module to transceive data from that location without interference from other components of the information handling system 400.

FIG. 4 also shows potential locations 446-1 through 446-7 of a plurality of power cells (herein referred to as power cells 446-1 through 446-7). The arrangement of the power cells 446-1 through 446-7 in FIG. 4 is meant to be exemplary and the present specification contemplates that the layout and number of power cells 446-1 through 446-7 may be varied based on the power requirements of the information handling system 400 and the available location within the battery housing 426 and information handling system 400. The embodiment shown in FIG. 4 shows that the battery housing 426 may be selectively removed and reinserted into a port formed into the housing of the information handling system 400. In this embodiment, the battery housing 426 may include an electrical and communication connection device that operatively couples the power cells 446-1 through 446-7 to the PMU, the battery-integrated antenna module 430 to the wireless interface adapter and antenna controller as described herein. Additionally, this connector may operatively couple the battery temperature sensor and antenna module temperature sensor to the integrated sensor hub in order to provide the temperature data to the EC for execution of the throttling of the charging/discharging rates of the battery power cells 446-1 through 446-7 and/or the throttling of the transception of the battery-integrated antenna module.

Figure 5:
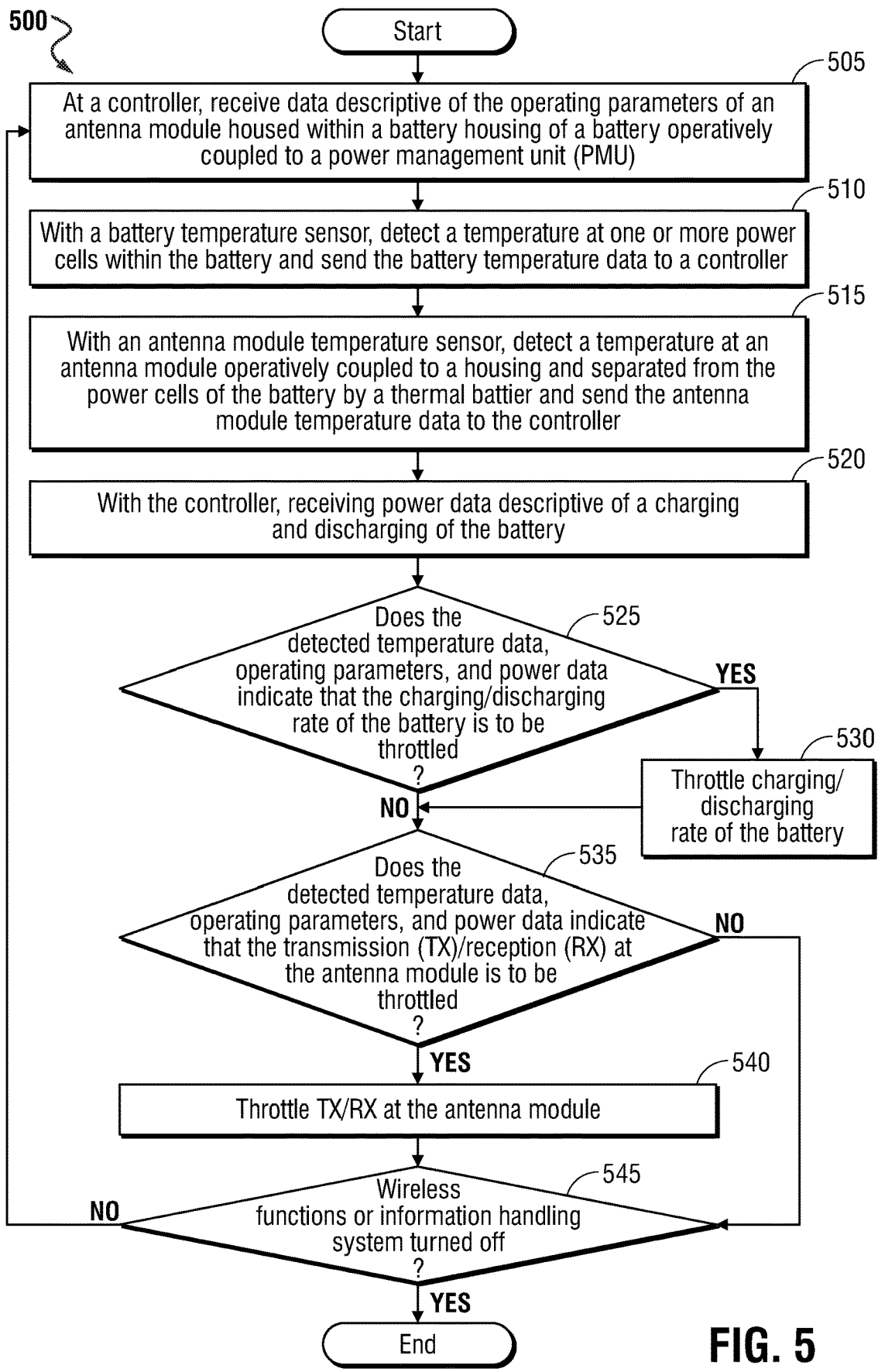
FIG. 5 is a flow diagram illustrating a method of operating a battery-integrated antenna module of an information handling system with a battery-integrated antenna management system according to an embodiment of the present disclosure.

FIG. 5 is a flow diagram illustrating a method 500 of operating a battery-integrated antenna module of an information handling system with a battery-integrated antenna management system according to an embodiment of the present disclosure. The method 500 may include, at block 505 with receiving at a controller (e.g., an EC, a processor, an antenna controller, a PMU, or combinations thereof) data descriptive of the operating parameters of an antenna module housed within a battery housing of a battery operatively coupled to a PMU. As described herein, these operating parameters may include, at least, the wireless protocol under which the antenna 162 of the antenna module 130 is being operated. For example, where the antenna is being used as a mmWave antenna operating at, for example, new radio FR1 or FR2, the antenna controller may provide this operating parameter data to the controller responsible for throttling either the battery or antenna module as described herein. In an embodiment, the operating parameters may include the power levels associated with operating the antenna such as the wattage consumed during transmission that would indicate a heating at the antenna due to this transmission. In another example, the operating parameters may include a detected level of uplink data bandwidth that would indicate transmission operation or intensity of data transmissions. The operating parameters may further include data describing, in one example embodiment, the type of application or applications being executed on the information handling system. For example, the execution of containerized applications on the information handling system with remote data processing needs (e.g., applications at the information handling system associated with cloud computing) increases the uplink and downlink data bandwidth requirements. Other operating parameters that may affect the decision to throttle the charging/discharging of the power cells of the battery or throttle the transception of the battery-integrated antenna module by the execution of the code instructions of the battery-integrated antenna management system as described herein are contemplated.

The method 500 may also include at block 510 with detecting a temperature at one or more power cells within the battery and its housing with a battery temperature sensor and send the battery temperature data to a controller executing code instructions of a battery-integrated antenna management system. The battery temperature sensor may be any sensor capable of detecting a real-time temperature within the battery and may be placed at any location within the battery or its housing. The frequency of the receipt of the temperature data from the battery temperature sensor may vary depending on the charging/discharging rate of the battery power cells and the use of the battery-integrated antenna module to transceive data.

The method 500 may also include at block 515 detecting a temperature at an antenna module operatively coupled to a housing and separated from the power cells of the battery by a thermal mitigation structure with the antenna module temperature sensor and send the antenna module temperature data to the controller executing code instructions of the battery-integrated antenna management system. The antenna module temperature sensor may be any sensor capable of detecting a real-time temperature of the antenna module and may be placed near or on the antenna module. The frequency of the receipt of the temperature data from the antenna module temperature sensor may vary depending on the charging/discharging rate of the battery power cells and the use of the battery-integrated antenna module to transceive data.

The method 500 may further include receiving power data descriptive of charging and discharging of the battery with the controller at block 520. In this embodiment, the power data may be requested by the controller or provided to the controller periodically by the battery in order to provide a current charge of the power cells and a predicted duration of time when the battery will be depleted at current discharging rates. In an embodiment, the PMU may gather this data and provide it to the controller executing code instructions of the battery-integrated antenna management system. The PMU may communicate with the processor in order to determine the processes and processing resources consumed by the processor in order to provide that data to the controller as additional operating parameters used by the controller to determine if and when to throttle the charging/discharging rates of the battery and/or throttle the transceptions at the antenna module (e.g., when to reduce power levels of the transmission at the antenna).

The method 500 may include, at block 525, determining, with the controller executing code instructions of the battery-integrated antenna management system if the detected temperature data, operating parameters, and power data indicate that the charging/discharging rate of the battery is to be throttled. In an embodiment, the EC may execute a driver or other software/firmware associated with controlling the throttling of the charging/discharging rates of the battery. Alternatively, the driver may be a standalone driver maintained on any memory storage device and executed by any processing device within the information handling system. In an embodiment, the execution of the driver may be independent of the operations of the OS and BIOS. In the embodiment where the EC executes the driver or other software or firmware, the EC may be responsible for receiving the detected temperature data, the operating parameters, and the power data as described herein and using this data as input to an algorithm or to implement a look-up table according to execution of code instructions for the battery-integrated antenna management system. In one example embodiment, the algorithm used may include a trained neural network used to determine whether to throttle the charging/discharging rates of the battery. This trained neural network may be trained at, for example, a server located on the network and provided to the information handling system in a trained state. The training of the neural network may be completed by the server after receiving a set of operating parameters, power data, and detected temperature data from one or more information handling systems operatively coupled to the server. In an embodiment, the trained neural network may be a layered feedforward neural network having an input layer with nodes for gathered detected temperature data, operating parameters, and power data as described herein. For example, the neural network may comprise a multi-layer perceptron neural network executed using the Python® coding language. Other types of multi-layer feed-forward neural networks are also contemplated, with each layer of the multi-layer network being associated with a node weighting array describing the influence each node of a preceding layer has on the value of each node in the following layer.

In the embodiment where the EC executing the code instructions of the battery-integrated antenna management system uses a look-up table, the EC may cross-reference the received, real-time, detected temperature data, operating parameters, and power data to determine whether to throttle the charging/discharging rates of the battery. In an embodiment, and based on the operating parameters, the EC may prioritize the operations of one of the antenna module and antenna over the battery or visa-versa. In the embodiment where a high data-through-put application is being executed such as a video streaming application, the EC may prioritize the operation of the antenna module over the battery. Alternatively, or additionally, where the battery has reached a threshold battery depletion level, the EC may prioritize the operations (e.g., charging) of the battery over the antenna module. In an example embodiment, the threshold battery depletion level is 30%. If and when this threshold battery depletion level is reached, the EC may switch from prioritizing the antenna module over the battery to prioritizing the battery over the antenna module. When this occurs, the antenna module may operate the antenna using a different protocol such as a 4G LTE protocol. In another example embodiment, where the battery depletion level is 80%, this may serve as an upper threshold indicating to the EC or other controller that the charging of the battery may be throttled in order to give preference to the operations of the antenna module and provide for protentional heat increases at the antenna module to be handled by the thermal mitigation structure of the battery housing rather than heat produced from the power cells of the battery.

In an embodiment where the detected temperature data, operating parameters, and power data indicate to the controller (e.g., the EC) executing the code instructions of the battery-integrated antenna management system that the charging/discharging rate of the battery is to be throttled, the method 500 may continue with the throttling of the charging/discharging rate of the battery at block 530. This is done in order to reduce the temperature within the battery and, in an embodiment, prioritize the operations of the battery-integrated antenna module.

In an embodiment where the detected temperature data, operating parameters, and power data indicate to the controller (e.g., the EC) executing the code instructions of the battery-integrated antenna management system that the charging/discharging rate of the battery is not to be throttled, the method 500 may continue with determining if the detected temperature data, operating parameters, and power data indicate that the transmission (TX)/reception (RX) at the antenna module is to be throttled at block 535. Similar to determining whether to throttle the charging/discharging rates of the battery, a determination of whether to throttle the transception of the antenna module may be made based on the execution of a trained neural network or access to a look up table according to execution of code instructions of the battery-integrated antenna management system. In an embodiment where the trained neural network is executed, the same neural network used to determine whether to throttle the charging/discharging rate of the battery may be used to determine whether to throttle the RX and TX at the antenna module. In an embodiment where the look-up table is used, the same look-up table used to determine whether to throttle the charging/discharging rate of the battery may be used to determine whether to throttle the RX and TX at the antenna module.

In an embodiment where the detected temperature data, operating parameters, and power data indicate to the controller (e.g., the EC) executing the code instructions of the battery-integrated antenna management system that the RX and TX at the antenna module is to be throttled, the method 500 may continue with the throttling of the RX and TX at the antenna module at block 540. This is done in order to reduce the temperature at the antenna module and, in an embodiment, prioritize the operations of the battery.

Similarly, the prioritization of the battery relative to the antenna module may be dependent on the detected temperature data received from the antenna module temperature sensor and battery temperature sensor. In an example embodiment, where the temperature of the battery or antenna module exceeds a threshold temperature, one or both of the operations of the battery or the antenna module may be throttled in order to reduce the temperature(s) and prevent damage to either of the battery or antenna module. The threshold temperature may be any temperature and may set based on the thermal disbursement capabilities of the thermal mitigation structure and thermal displacement mechanisms and the temperature susceptibilities of the power cells and antenna module among other physical characteristics of the systems described herein.

In an embodiment, the PMU may provide charging/discharging data to the EC for the EC executing the code instructions of the battery-integrated antenna management system to use to determine an expected temperature of the battery. In this embodiment, the EC may have a look-up table that is used to cross-reference this charging/discharging data to determine expected temperatures within the battery. This may be an alternative to implementing a battery temperature sensor to determine the temperature of the battery in an embodiment. In an alternative embodiment, the use of this look-up table may be supplemented with the temperature data received from the battery temperature sensor to confirm the temperature, in real-time, at the battery and predict temperature changes within the battery as the charging/discharging of the battery occurs.

Similarly, in an embodiment, the PMU may provide power data indicative of the power provided to the antenna to the EC. The EC executing the code instructions of the battery-integrated antenna management system may use this power data to determine an expected temperature of the antenna. In this embodiment, the EC may have a look-up table that is used to cross-reference this power data to determine expected temperatures at the antenna. This may be an alternative to implementing a battery temperature sensor to determine the temperature of the antenna in an embodiment. In an alternative embodiment, the use of this look-up table may be supplemented with the temperature data received at the antenna temperature sensor to confirm the temperature, in real-time, at the antenna and predict temperature changes at the antenna as the changes in data transmissions are made.

The processes implemented to throttle the TX/RX of the antenna module and the processes implemented to throttle the charging/discharging rate of the battery may be done independently of each other in an embodiment. In another example embodiment, the throttling of either of the TX/RX of the antenna module or the charging/discharging rate of the battery may be dependent on each process being carried out or not. For example, where the temperature data received by either of the antenna module temperature sensor or battery temperature sensor indicates that either the throttling of the charging/discharging rate of the battery should be conducted or the throttling of the TX/RX of the antenna module, the reduction in temperature at the battery may allow the battery or antenna module to continue to operate. For example, where the temperature data indicates to the EC that the temperature with the battery is high, the charging/discharging rate of the battery may be throttled in order to allow the operations of the antenna module to be given preference where, for example, the operating parameters indicate that an application is being executed that requires a high data throughput (e.g., a streaming application, an online gaming application, among others). The prioritization may be made based on the other inputs to the trained neural network or the cross-referencing of the detected temperature data, operating parameters, and the power data with the look-up table as described herein.

Where throttling of the charging/discharging rate of the battery and/or throttling of the RX/TX of the antenna module at blocks 530 and 540, the method 500 proceeds to block 545, determining whether the wireless functions or the information handling system itself has been turned off. Where the wireless functions are continuing to be operated, the method 500 may return to blocks 505, 510, 515, and 520 with continuing to receive the detected temperature data, operating parameters, and the power data. Where either the wireless functions or the information handling system itself have been turned off, the method 500 may end.

The blocks of the flow diagrams of FIG. 5 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another may communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. An information handling system with a battery-integrated antenna module, comprising:
    a processor;
    a memory;
    a power management unit (PMU);
    an antenna controller to monitor data descriptive of the operating parameters, including transmission (TX)/reception (RX) levels, of a battery-integrated antenna module housed within a battery housing of a battery operatively coupled to the PMU;
    a controller to monitor power data descriptive of a charging and discharging of the battery and receive TX/RX levels and operating parameters of the battery integrated antenna module;
    the battery housing including:
        the battery-integrated antenna module operatively coupled to the housing of the battery and operatively coupled to the antenna controller;
        one or more power cells of the battery;
        a thermal mitigation structure placed in the battery housing to sink heat generated by the battery-integrated antenna module and the one or more power cells; and
        a cable array operatively coupling the batter-integrated antenna module to the controller to receive the data descriptive of the operating parameters, including the TX/RX levels, of a battery-integrated antenna module at the controller;
    the controller executing code instructions of a battery-integrated antenna management system to receive temperature data of the battery and the battery-integrated antenna module and determine to throttles the charge/discharge rate of the battery or to throttles the TX/RX levels at the battery-integrated antenna module based on the detected temperature data, operating parameters, and the power data.

2. The information handling system of claim 1, wherein the controller is an embedded controller to receive the detected temperature data, operating parameters, and the power data and direct the PMU or antenna controller to throttle the charge/discharge rate of the battery or throttle the TX/RX levels at the battery-integrated antenna module.

3. The information handling system of claim 1, wherein the controller to execute a driver to receive the detected temperature data, operating parameters, and the power data and direct the PMU or antenna controller to throttle the charge/discharge rate of the battery or throttle the TX/RX levels at the battery-integrated antenna module.

4. The information handling system of claim 1, wherein the mitigation structure includes a vapor chamber placed between the battery-integrated antenna module and the power cells.

5. The information handling system of claim 1, wherein the thermal mitigation structure is a heat pipe operatively coupled to a cooling system within the information handling system.

6. The information handling system of claim 1, wherein the thermal mitigation structure a graphite layer.

7. The information handling system of claim 1, wherein the battery-integrated antenna module is operatively coupled at a location on the battery housing that places the battery-integrated antenna module at an outer surface location to transmit and receive data when installed into the information handling system.

8. The information handling system of claim 1 further comprising:
    an aerogel placed between the one or more power cells and the battery-integrated antenna module to insulate for changes in temperature between the battery-integrated antenna module and the power cells.

9. A battery of an information handling system, comprising:
    the battery including:
        a battery-integrated antenna module operatively coupled to a housing of the battery for transmission (TX) and reception (RX) of wireless signals;
        one or more power cells disposed in the housing of the battery;
        a thermal mitigation structure around the sides of the housing for the battery and between the one or more power cells and the battery-integrated antenna module to cool the battery-integrated antenna module and the one or more power cells of the battery; and
    a cable array operatively coupling the battery-integrated antenna module to an antenna controller and a wireless adapter to transceive wireless signals.

10. The battery of claim 9 further comprising:
    the controller to receive data descriptive of the operating parameters of the battery-integrated antenna module including TX/RX levels from the antenna controller, wherein the controller is operatively coupled to a power management unit (PMU);
    the controller to receive temperature data of the battery and of the battery-integrated antenna module;
    the controller to receive power data descriptive of a charging and discharging of the battery from the PMU; and
    wherein the controller throttles the charge/discharge rate of the battery or throttles the transmission (TX)/reception (RX) at the battery-integrated antenna module based on the detected temperature data, operating parameters, and the power data.

11. The battery of claim 9, wherein the thermal mitigation structure is a vapor chamber.

12. The battery of claim 9, wherein the thermal mitigation structure is a heat pipe.

13. The battery of claim 9, wherein the thermal mitigation structure is a heat pipe operatively coupled to a cooling system within the information handling system.

14. The battery of claim 9, wherein the thermal mitigation structure is a graphite layer.

15. The battery of claim 9, wherein the battery-integrated antenna module is operatively coupled at a location on the battery that places the battery-integrated antenna module at an outer surface location to transmit and receive data when installed into the information handling system.

16. The battery of claim 9 further comprising:
a thin layer of aerogel placed between the thermal mitigation structure and the battery-integrated antenna module to insulate from shielding an antenna transmission.

17. A method of operating a battery-integrated antenna module and a battery, comprising:
with an embedded controller, receiving data descriptive of the operating parameters, including transmission (TX)/reception (RX) levels, of the battery-integrated antenna module housed within a battery housing of the battery that is operatively coupled to a power management unit (PMU);
with a battery temperature sensor, detecting a temperature at one or more power cells within the battery and sending the battery temperature data to embedded controller;
with an antenna module temperature sensor, detecting a temperature at the battery-integrated antenna module operatively coupled to a thermal mitigation structure of the battery housing thermally coupled to the battery-integrated antenna module and the battery and sending battery-integrated antenna module temperature data to the embedded controller;
with the embedded controller:
receiving power data descriptive of a charging and discharging of the battery from the PMU;
throttling the charge/discharge rate of the battery based on the detected battery-integrated antenna module temperature data, detected battery temperature data, detected operating parameters of the battery-integrated antenna module, and the power data when data transmission is prioritized over battery charge/discharge to control thermal levels of the battery-integrated antenna module battery; or
throttling the TX/RX levels at the battery-integrated antenna module, via a cable array operatively coupling the embedded controller and an antenna controller, based on the detected battery-integrated antenna module temperature data, detected battery temperature data, detected operating parameters of the battery-integrated antenna module, and the power data when battery charge/discharge is prioritized over data TX to control thermal levels of the battery-integrated antenna module and the batter V.

18. The method of claim 17, wherein the thermal mitigation structure is a heat pipe operatively coupled to a cooling system within the information handling system.

19. The method of claim 17, wherein data TX is prioritized over battery charge/discharge when a charge level of the battery exceeds a bottom threshold level.

20. The method of claim 17, wherein battery charge/discharge is prioritized over data TX when a charge level of the battery is below a bottom threshold level.

* * * * *